US012722374B2

(12) United States Patent
Murata

(10) Patent No.: US 12,722,374 B2
(45) Date of Patent: Sep. 1, 2026

(54) DROPLET DISCHARGING DEVICE AND DROPLET DISCHARGING METHOD

(71) Applicant: SIJTechnology, Inc., Tsukuba (JP)

(72) Inventor: Kazuhiro Murata, Tsukuba (JP)

(73) Assignee: SIJTechnology, Inc., Tsukuba (JP)

( * ) Notice: Subject to any disclaimer, the term of this patent is extended or adjusted under 35 U.S.C. 154(b) by 212 days.

(21) Appl. No.: 18/829,904

(22) Filed: Sep. 10, 2024

(65) Prior Publication Data

US 2024/0424789 A1 Dec. 26, 2024

Related U.S. Application Data

(63) Continuation of application No. PCT/JP2023/004419, filed on Feb. 9, 2023.

(30) Foreign Application Priority Data

Mar. 23, 2022 (JP) ................................ 2022-047475

(51) Int. Cl.
*B41J 2/14* (2006.01)
*B41J 2/165* (2006.01)

(52) U.S. Cl.
CPC ......... *B41J 2/1433* (2013.01); *B41J 2/14201* (2013.01); *B41J 2/14314* (2013.01);
(Continued)

(58) Field of Classification Search
CPC .. B41J 2/1433; B41J 2/14201; B41J 2/14314; B41J 2/16517; B41J 2/16579;
(Continued)

(56) References Cited

U.S. PATENT DOCUMENTS

2014/0085364 A1 3/2014 Otake
2019/0030912 A1* 1/2019 Zhao ........................ B41J 2/145
(Continued)

FOREIGN PATENT DOCUMENTS

CN 103692775 A 4/2014
CN 104442148 A 3/2015
(Continued)

OTHER PUBLICATIONS

English translation of Written Opinion of PCT/JP2023/004419, mailed Apr. 18, 2023 (3 pages).
(Continued)

*Primary Examiner* — Bradley W Thies
(74) *Attorney, Agent, or Firm* — Quarles & Brady LLP

(57) ABSTRACT

A droplet discharging device according to an embodiment of the present disclosure includes an object holding unit configured to hold an object, at least one first droplet discharging nozzle configured to discharge a first droplet, a plurality of second droplet discharging nozzles having a second tip having a second inner diameter smaller than a first inner diameter of a first tip of the first droplet discharging nozzle and configured to discharge a second droplet using the first droplet discharged from the first droplet discharging nozzle, and a driving unit configured to control a relative positional relationship between the object held by the object holding unit and the second droplet discharging nozzle and a relative positional relationship between the first droplet discharging nozzle and the second droplet discharging nozzle.

10 Claims, 10 Drawing Sheets

(52) U.S. Cl.
CPC ....... *B41J 2/16517* (2013.01); *B41J 2/16579* (2013.01); *B41J 2002/14475* (2013.01)

(58) Field of Classification Search
CPC ............ B41J 2002/14475; B41J 2/2125; B41J 2002/043; B41J 2/145; B41J 2/162; B41J 2/04576; B41J 2/04581; B41J 3/407; B05B 5/0255; G02B 5/20; G02F 1/1303; G02F 1/133514
See application file for complete search history.

(56) References Cited

U.S. PATENT DOCUMENTS

| | | | |
|---|---|---|---|
| 2021/0053345 | A1 | 2/2021 | Murata |
| 2021/0070047 | A1 | 3/2021 | Murata |
| 2022/0212466 | A1 | 7/2022 | Murata |

FOREIGN PATENT DOCUMENTS

| | | | |
|---|---|---|---|
| JP | H1034967 | A | 2/1998 |
| TW | 202126494 | A | 7/2021 |
| WO | 2020217755 | A1 | 10/2020 |
| WO | 2020217756 | A1 | 10/2020 |
| WO | 2021065435 | A1 | 4/2021 |

OTHER PUBLICATIONS

Korean Intellectual Property Office, Request for the Submission of an Opinion, Application No. 10-2024-7021737, Dec. 8, 2025, 7 pages.

Office Action from Japanese Application No. 2022-047475 dated Sep. 2, 2025 (6 pages).

International Search Report of PCT/JP2023/004419, mailed Apr. 18, 2023 (5 pages).

Written Opinion of PCT/JP2023/004419, mailed Apr. 18, 2023 (3 pages).

Extended European Search Report (EESR) dated Mar. 16, 2026 issued in EP Appl. No. 23774282.0 (6 pages).

Office Action dated Mar. 18, 2026 issued in TW Appl. No. 112106862 (12 pages).

* cited by examiner

DROPLET DISCHARGING DEVICE AND DROPLET DISCHARGING METHOD

CROSS-REFERENCE TO RELATED APPLICATIONS

This application is a Continuation of International Patent Application No. PCT/JP2023/004419, filed on Feb. 9, 2023, which claims the benefit of priority to Japanese Patent Application No. 2022-047475, filed on Mar. 23, 2022, the entire contents of which are incorporated herein by reference.

FIELD

The present disclosure relates to a droplet discharging device and a droplet discharging method.

BACKGROUND

In recent years, application of inkjet printing technology to industrial processes has been carried out. For example, a color filter manufacturing process for a liquid crystal display is an example. Conventionally, although a so-called piezo type head that discharges droplets by mechanical pressure or vibration has been widely used as an inkjet printing technique, an electrostatic discharging type inkjet head that can discharge finer droplets has attracted attention. Japanese Laid-Open Patent Publication No. H10-34967 discloses an electrostatic discharging type inkjet recording device.

SUMMARY

According to an embodiment of the present disclosure, a droplet discharging device is provided including an object holding unit configured to hold an object, at least one first droplet discharging nozzle configured to discharge a first droplet, a plurality of second droplet discharging nozzles having a second tip having a second inner diameter smaller than a first inner diameter of a first tip of the first droplet discharging nozzle and configured to discharge a second droplet using the first droplet discharged from the first droplet discharging nozzle, and a driving unit configured to control a relative positional relationship between the object held by the object holding unit and the second droplet discharging nozzle and a relative positional relationship between the first droplet discharging nozzle and the second droplet discharging nozzle.

In the droplet discharging device, each of the plurality of second droplet discharging nozzles may be connected to a plate unit having a through hole having a third inner diameter larger than the second inner diameter.

In the droplet discharging device, the at least one first droplet discharging nozzle may include a plurality of first droplet discharging nozzles, and a distance between adjacent second droplet discharging nozzles may be smaller than a distance between adjacent first droplet discharging nozzles.

In the droplet discharging device, the first droplet discharging nozzle may be a piezo type nozzle, and the second droplet discharging nozzle may be an electrostatic discharging type nozzle.

In the droplet discharging device, the plurality of second droplet discharging nozzles may be provided in a first direction and a second direction intersecting the first direction.

The droplet discharging device may further include an inspection unit for inspecting an opening state of the second droplet discharging nozzle.

In the droplet discharging device, the second droplet discharging nozzle may be cleaned when a predetermined condition is satisfied.

According to an embodiment of the present disclosure, a droplet discharging method is provided including providing a first droplet discharged by a first droplet discharging nozzle to at least one of a plurality of second droplet discharging nozzles arranged with a second tip having a second inner diameter smaller than a first inner diameter of a first tip in the first droplet discharging nozzle, and the second droplet discharging nozzle provided with the first droplet discharges a second droplet to an object using the first droplet.

In the droplet discharging method, the first droplet discharging nozzle may be a piezo type nozzle, and the second droplet discharging nozzle may be an electrostatic discharging type nozzle.

In the droplet discharging method, the second droplet discharging nozzle may be cleaned when a predetermined condition is satisfied.

It is possible to provide a droplet discharging device capable of changing a discharging pattern without replacing a multi-nozzle head by using an embodiment of the present disclosure.

DESCRIPTION OF EMBODIMENTS

Figure 1:
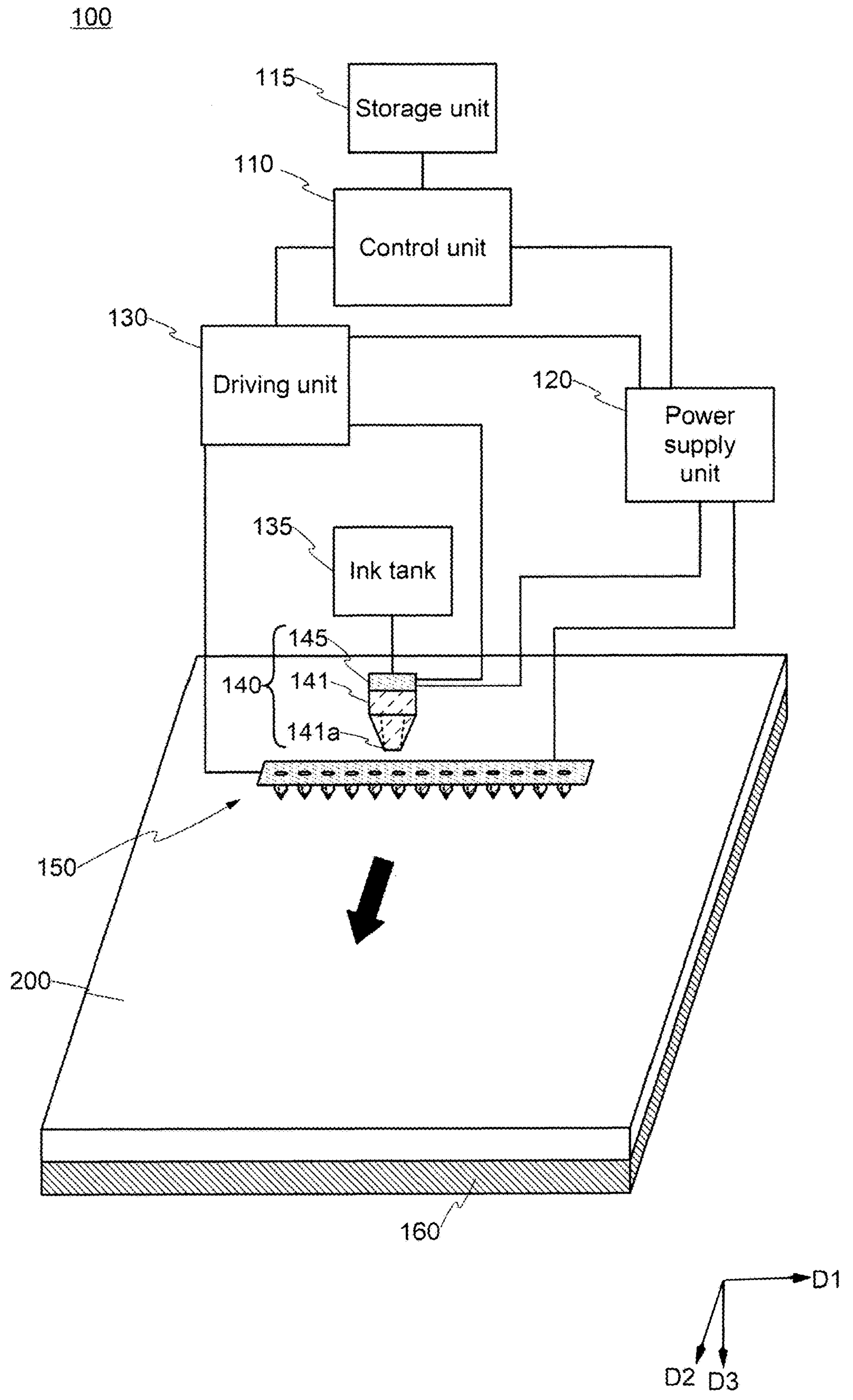
FIG. 1 is a schematic diagram of a droplet discharging device according to an embodiment of the present disclosure.

Hereinafter, embodiments of the disclosure disclosed in the present application will be described with reference to the drawings. However, the present disclosure can be implemented in various forms without departing from the gist thereof, and is not to be construed as being limited to the description of the embodiments exemplified below.

In addition, in the drawings referred to in the present embodiment, the same or similar parts are denoted by the same reference signs or similar reference signs (only denoted by A, B, −1, −2, or the like after the numerals), and repeated description thereof may be omitted. In addition, dimensional ratios in the drawings may be different from actual ratios for convenience of explanation, or a part of the configuration may be omitted from the drawings.

Furthermore, in the detailed description of the present disclosure, when defining a positional relationship between one component and another component, "above" and "below" include not only the case where the component is located directly above or directly below, but also the case where another component is interposed therebetween unless otherwise specified.

Recently, from the viewpoint of improving productivity while taking advantage of the characteristics of an electrostatic discharging type inkjet head capable of discharging fine droplets, the development of a simultaneous discharging type multi-nozzle head is underway. In the case of a simultaneous discharging type multi-nozzle head, the arrangement of nozzles can be arbitrarily designed. However, in the case of such a multi-nozzle head, there remains a problem that only a pattern of a predetermined nozzle arrangement is formed. In order to form a discharge pattern different from a predetermined pattern, it is necessary to separately prepare a multi-nozzle head having a new nozzle arrangement. In this case, there is a problem in that it takes extra time to replace the multi-nozzle head in accordance with the replacement. On the other hand, in the case of a piezo type multi-nozzle head having a fixed pitch which is conventionally exists, (1) in addition to a problem that it is difficult to reduce an initial discharging amount, (2) there is a problem that it is necessary to perform raster scanning instead of simultaneous discharging in order to discharge ink to a position different from a nozzle pitch. Therefore, there is a limit of scan speed in the formation time of the pattern.

Therefore, an object of the present disclosure is to provide a droplet discharging device capable of changing a discharging pattern without replacing a multi-nozzle head.

First Embodiment

[1-1. Configuration of Droplet Discharging Device 100]

FIG. 1 is a schematic diagram of a droplet discharging device 100 according to an embodiment of the present disclosure.

The droplet discharging device 100 includes a control unit 110, a storage unit 115, a power supply unit 120, a driving unit 130, an ink tank 135, a first droplet discharging unit 140, a second droplet discharging unit 150, and an object holding unit 160.

The control unit 110 includes a CPU (Central Processing Unit), an ASIC (Application Specific Integrated Circuit), an FPGA (Field Programmable Gate Array), or another arithmetic processor. The control unit 110 controls droplet discharging processing by the first droplet discharging unit 140 using a droplet discharging program set in advance.

The storage unit 115 has a function as a database for storing a droplet discharging program and various kinds of information used in the droplet discharging program. A memory, an SSD, or a storable element are used as the storage unit 115.

The power supply unit 120 is connected to the control unit 110, the storage unit 115, the driving unit 130, the ink tank 135, the first droplet discharging unit 140, the second droplet discharging unit 150, and the object holding unit 160. The power supply unit 120 applies a voltage to the first droplet discharging unit 140 and the second droplet discharging unit 150 based on a signal input from the control unit 110. In this example, the power supply unit 120 applies a pulse voltage to the first droplet discharging unit 140 and the second droplet discharging unit 150. In addition, the voltage is not limited to the pulse voltage, and a constant voltage may be constantly applied. A first droplet 147 is discharged in a direction (third direction D3) of an object 200 from a tip 141*a* of a first droplet discharging nozzle 141, which will be described later, by the voltage applied from the power supply unit 120 to the first droplet discharging unit 140. Similarly, a second droplet 157 is discharged in the direction (third direction D3) of the object 200 from a second droplet discharging nozzle 153 (a tip 153*a*) arranged in a multi-nozzle head 151, which will be described later, of the second droplet discharging unit 150 by the voltage applied from the power supply unit 120 to the second droplet discharging unit 150.

The driving unit 130 includes a drive member such as a motor, a belt, or a gear. The driving unit 130 moves the first droplet discharging unit 140 (the first droplet discharging nozzle 141) and the second droplet discharging unit 150 (more specifically, the multi-nozzle head 151) relative to the object holding unit 160 (in this embodiment, a second direction D2) based on an instruction from the control unit 110. Thus, the driving unit 130 controls a relative positional relationship between the object 200 and the multi-nozzle head 151 (the second droplet discharging nozzle 153) when using the device (during droplet discharging) and a relative positional relationship between the first droplet discharging nozzle 141 and the multi-nozzle head 151 (the second droplet discharging nozzle 153) when using of device (during droplet discharging).

The driving unit 130 may appropriately fix the first droplet discharging unit 140 (the first droplet discharging nozzle 141) and the second droplet discharging unit 150 (the multi-nozzle head 151) to move the object 200. Further, the driving unit 130 may be used in combination with a goniometer stage to finely adjust the first droplet discharging nozzle 141 and the multi-nozzle head 151 (the second droplet discharging nozzle 153).

The object holding unit 160 has a function of holding the object 200. In this example, a stage is used as the object holding unit 160. A mechanism by which the object holding unit 160 holds the object 200 is not particularly limited, and a general holding mechanism is used. In this example, the object 200 is held to the object holding unit 160 by vacuum suction. In addition, the present disclosure is not limited to this, and the object holding unit 160 may hold the object 200 using a fixture.

The object 200 is a member to which droplets discharged from the droplet discharging unit are discharged. In this example, a glass plate is used for the object 200. In addition, the object 200 is not limited to the glass plate. For example, the object 200 may be a metal plate or an organic resin member. Further, a metal wiring or an organic resin member may be formed on the object 200. In addition, a counter electrode for discharging droplets may be arranged on the object 200. In this case, a GND potential may be applied to the object 200.

[1-2. Configuration of First Droplet Discharging Unit 140]

The first droplet discharging unit 140 is arranged above the object 200 (the object holding unit 160) and the second droplet discharging unit 150 when discharging a droplet by the driving unit 130. The first droplet discharging unit 140 includes the first droplet discharging nozzle 141 and a piezoelectric element 145 for discharging the droplet (first droplet 147). In this example, a piezo type ink jet nozzle is used as the first droplet discharging nozzle 141. Although the piezoelectric element 145 is arranged above the first droplet discharging nozzle 141, the arrangement of the piezoelectric element 145 may be changed as appropriate. The piezoelectric element 145 is electrically connected to the power supply unit 120. The piezoelectric element 145 presses liquid supplied from the ink tank 135 by a voltage applied from the power supply unit 120, thereby the piezoelectric element 145 discharges the first droplet 147 from the tip 141*a* (also referred to as a first tip) of the first droplet discharging nozzle 141.

The first droplet discharging nozzle 141 of the first droplet discharging unit 140 is arranged perpendicularly to a surface of the object 200 (an upper surface of the object holding unit 160).

[1-3. Configuration of the Second Droplet Discharging Unit 150]

The second droplet discharging unit 150 is arranged above the object 200 (the object holding unit 160) when discharging a droplet by the driving unit 130. The first droplet discharging unit 140 is arranged above the second droplet discharging unit 150 when discharging a droplet. Therefore, the second droplet discharging unit 150 is arranged between the first droplet discharging unit 140 and the object 200 (object holding unit 160) when discharging a droplet. The second droplet discharging unit 150 may be partially connected or fixed to the first droplet discharging unit 140. The second droplet discharging unit 150 includes the multi-nozzle head 151.

The multi-nozzle head 151 is used fixed to a mount and an attachment (not shown). The multi-nozzle head 151 is arranged with a plurality of second droplet discharging nozzles 153 for discharging droplets (second droplets 157). An electrostatic discharging type inkjet nozzle is used as the second droplet discharging nozzle 153. Details of the multi-nozzle head 151 will be described in detail below.

[1-4. Configuration of Multi-Nozzle Head 151]

Figure 2:
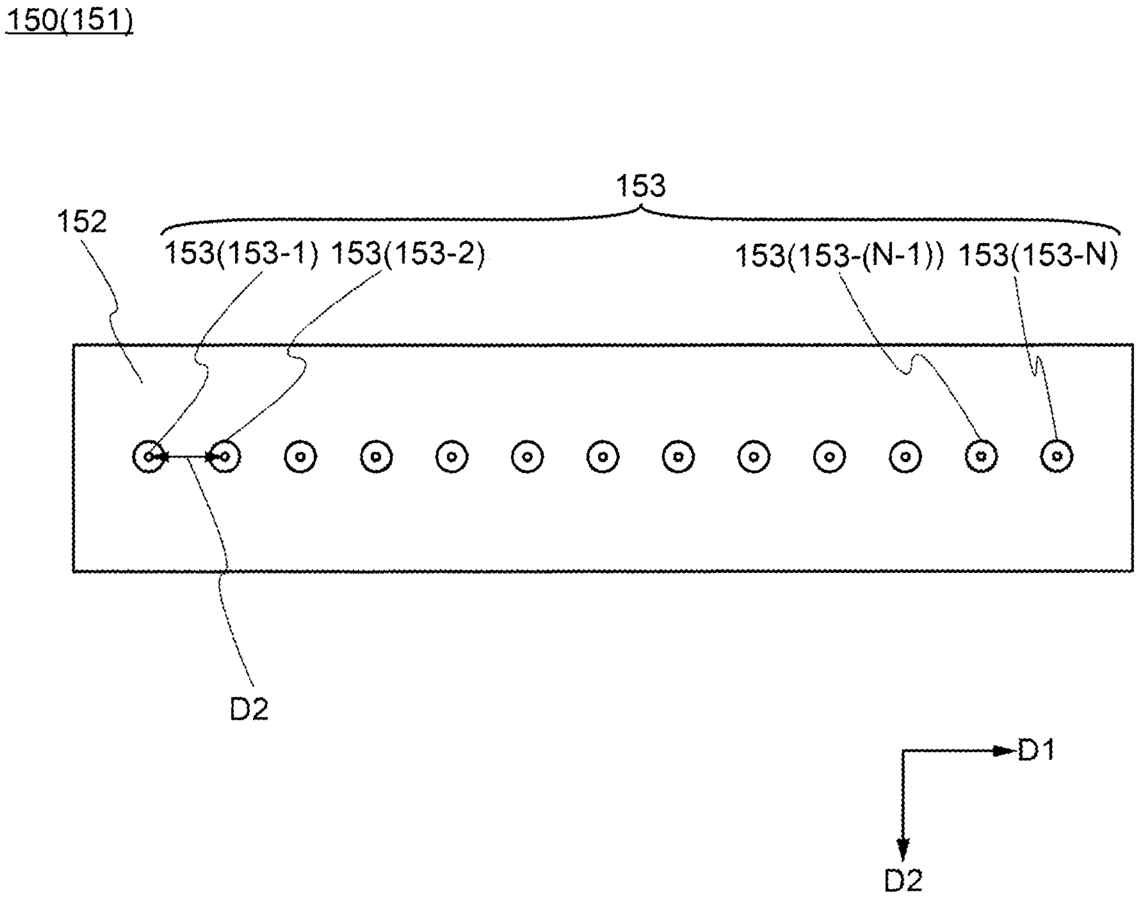
FIG. 2 is a plan view of a multi-nozzle head according to an embodiment of the present disclosure.
Figure 3:
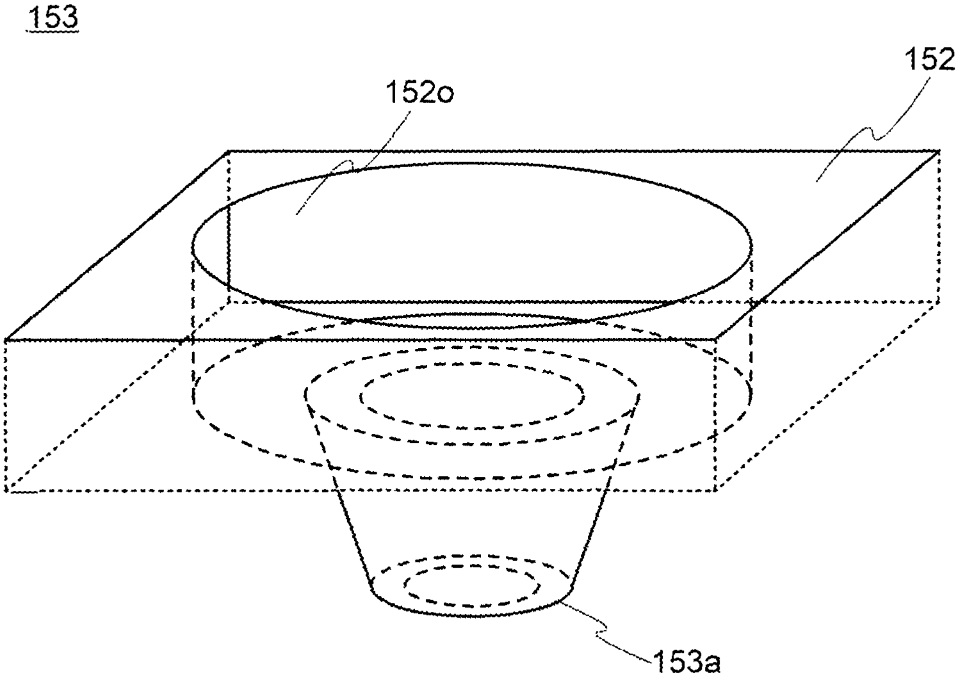
FIG. 3 is a perspective view of a droplet discharging nozzle according to an embodiment of the present disclosure.
Figure 4A:
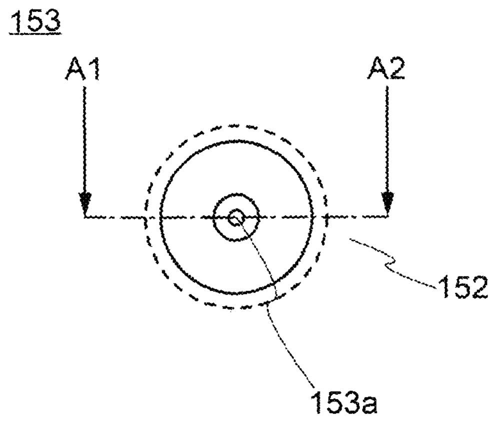
FIG. 4A is a plan view of a droplet discharging nozzle according to an embodiment of the present disclosure.
Figure 4B:
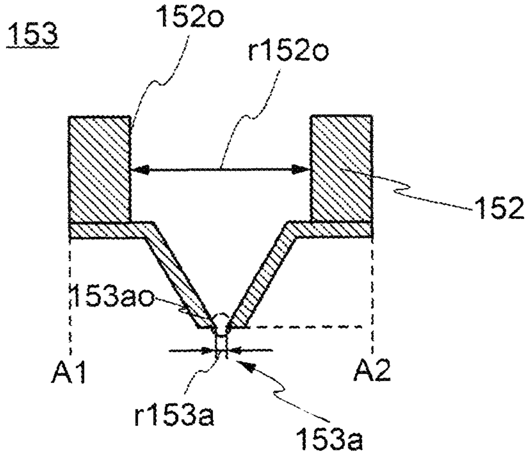
FIG. 4B is a cross-sectional view of a droplet discharging nozzle according to an embodiment of the present disclosure.

FIG. 2 is a plan view of the multi-nozzle head 151. FIG. 3 is a perspective view of the second droplet discharging nozzle 153. FIG. 4A is a top view of the second droplet discharging nozzle 153. FIG. 4B is a cross-sectional view between A1-A2 of the second droplet discharging nozzle 153.

As shown in FIG. 2, the multi-nozzle head 151 includes a plate unit 152 and a second droplet discharging nozzle 153.

The plate unit 152 is arranged in a plate shape. In this example, the plate unit 152 extends in a first direction D1. Although a metal material such as nickel, copper, or stainless steel is used as the plate unit 152, the material may be appropriately changed as long as the material is used in the case where a potential can be applied. A thickness of the plate unit 152 is appropriately set. In this example, the thickness of the plate unit 152 is 10 μm or more and 100 μm or less.

As shown in FIG. 3, FIGS. 4A and 4B, the second droplet discharging nozzle 153 is arranged to be connected to one surface (lower surface) of the plate unit 152 at an upper portion thereof. The multi-nozzle head 151 includes a plurality of second droplet discharging nozzles 153. The second droplet discharging nozzles 153 are arranged side by side in the first direction D1. In the present embodiment, second droplet discharging nozzles 153-1, 153-2, . . . , 153-(N−1) and 153-N are arranged on the plate unit 152. N is a natural number equal to or greater than 3. In addition, in the case where the second droplet discharging nozzles 153-1, 153-2, . . . , 153-(N−1) and 153-N do not need to be separately described, they will be described as the second droplet discharging nozzle 153. A metal material such as nickel, copper, or the like is used for the second droplet discharging nozzle 153, but may be appropriately changed as long as the material is used when a potential can be applied. The second droplet discharging nozzle 153 has a tapered shape. In this example, a distance d1 between adjacent second droplet discharging nozzles 153 (a distance between the second droplet discharging nozzle 153-1 and the second droplet discharging nozzle 153-2) is 200 μm.

The plate unit 152 has a through hole 152*o* having an inner diameter r152*o* (also referred to as a third inner diameter) larger than an inner diameter r153*a* (also referred to as a second inner diameter) of a discharging port of the second droplet discharging nozzle 153 (an opening portion 153*ao* on the tip 153*a* of the second droplet discharging nozzle 153) at a portion corresponding to (a portion that overlaps) the second droplet discharging nozzle 153. The inner diameter of the through hole of the plate unit 152 may be 1 μm or more and 100 μm or less. The inner diameter of the tip 153*a* of the second droplet discharging nozzle 153 may be several hundred nm or more and 50 μm or less, preferably 1 μm or more and 30 μm or less, and more preferably 5 μm or more and 20 μm or less. In the present embodiment, a voltage may be applied to the second droplet discharging nozzle 153, a voltage may be applied to the plate unit 152, or a voltage may be applied to ink stored in the second droplet discharging nozzle 153. In the case where a voltage is applied to the plate unit 152 and the second droplet discharging nozzle 153, an electrode may be arranged. The electrode may include tungsten, nickel, molybdenum, titanium, gold, silver, copper, platinum, or the like. In this case, a plurality of electrodes may be arranged so that the voltage is uniformly applied to the entire plate unit 152. Further, in the present embodiment, although an example in which a voltage is applied to the second droplet discharging nozzle 153, the plate unit 152, or the ink has been described, the voltage may be applied to a jig (for example, a mount or an attachment) holding the multi-nozzle head 151.

The inner diameter r153*a* (the second inner diameter) of the discharging port (the tip 153*a*) of the second droplet discharging nozzle 153 is smaller than the inner diameter (also referred to as the first inner diameter) of the discharging port (the tip 141*a*) of the first droplet discharging nozzle 141. Therefore, a discharge amount per unit time of the second droplet discharging nozzle 153 is smaller than a discharge amount per unit time of the first droplet discharging nozzle 141.

Further, in the present embodiment, the second droplet discharging unit 150 is not connected to the ink tank 135. When discharging a droplet, the first droplet discharging unit 140 (the first droplet discharging nozzle 141) moves above the second droplet discharging unit 150 (the multi-nozzle head 151) by the control unit 110 and the driving unit 130. That is, in the case of the present embodiment, it is possible to control a position to be discharged based on the relative positional relationship between the first droplet discharging nozzle 141 and the multi-nozzle head 151 including a plurality of second droplet discharging nozzles.

[1-5. Droplet Discharging Method]

Next, a droplet discharging method according to the present embodiment will be described. FIG. 5 to FIG. 8 are schematic diagrams showing the droplet discharging method.

Figure 5:
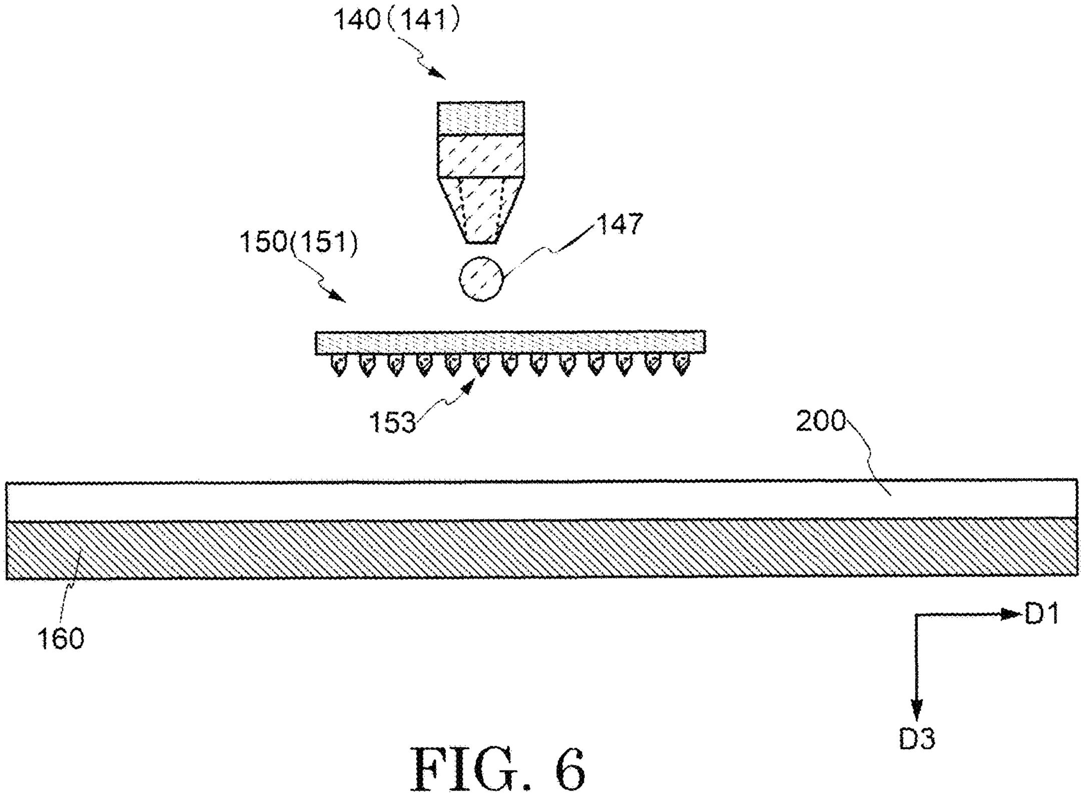
FIG. 5 is a schematic diagram showing a droplet discharging method according to an embodiment of the present disclosure.

First, the first droplet discharging unit 140 is moved to a predetermined position in the first direction D1 by the control unit 110 and the driving unit 130. In this case, the first droplet discharging unit 140 (the first droplet discharging nozzle 141) is arranged at a predetermined position on the multi-nozzle head 151 in the second droplet discharging unit 150. Next, as shown in FIG. 5, the first droplet discharging nozzle 141 discharges liquid held in the ink tank 135 as a first droplet 147 in a third direction D3 (specifically, downward) toward a predetermined position above the multi-nozzle head 151 by the voltage applied from the power supply unit 120.

Figure 6:
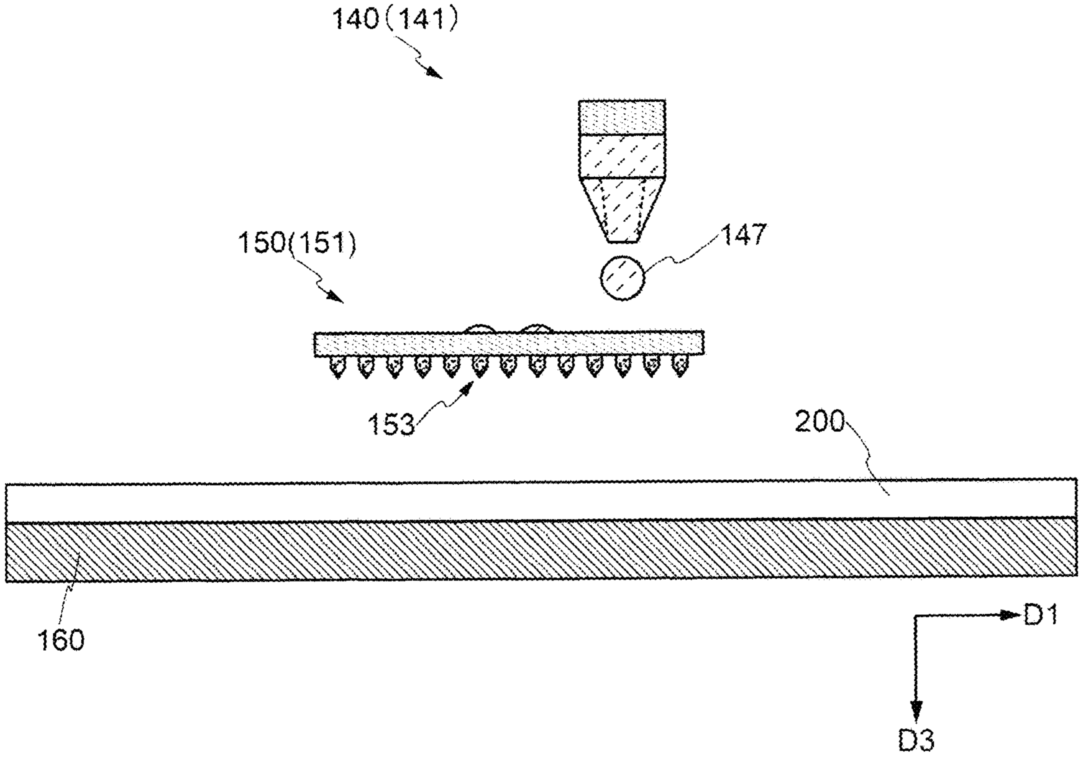
FIG. 6 is a schematic diagram showing a droplet discharging method according to an embodiment of the present disclosure.

The discharged first droplet 147 is provided to a predetermined second droplet discharging nozzle 153 and temporarily stored. As shown in FIG. 6, the first droplet discharging unit 140 repeatedly performs the processing described above. This provides (stores) the first droplet 147 to some of the second droplet discharging nozzles 153 of the plurality of second droplet discharging nozzles 153. In this case, in the present embodiment, the second droplet discharging nozzle 153 is connected to the plate unit 152 on an upper side. The plate unit 152 has a through hole having an inner diameter larger than an inner diameter of the second droplet discharging nozzle 153. Accordingly, it can be said that the second droplet discharging nozzle 153 has a structure in which the first droplet can be easily stored.

Figure 7:
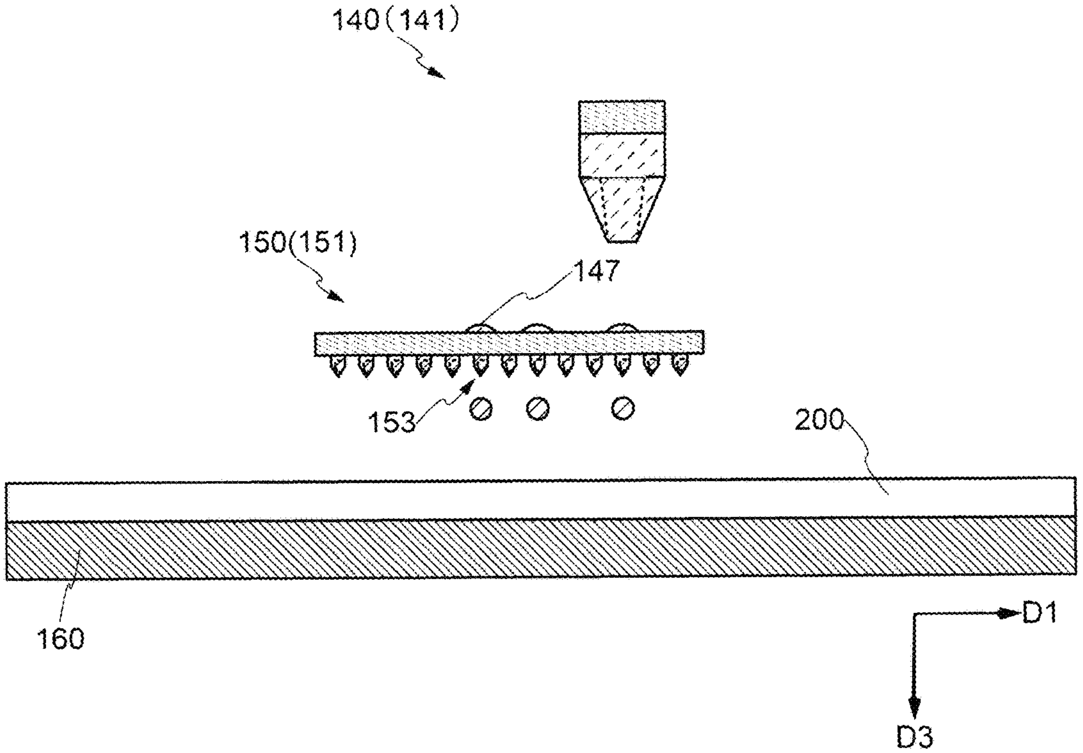
FIG. 7 is a schematic diagram showing a droplet discharging method according to an embodiment of the present disclosure.
Figure 8:
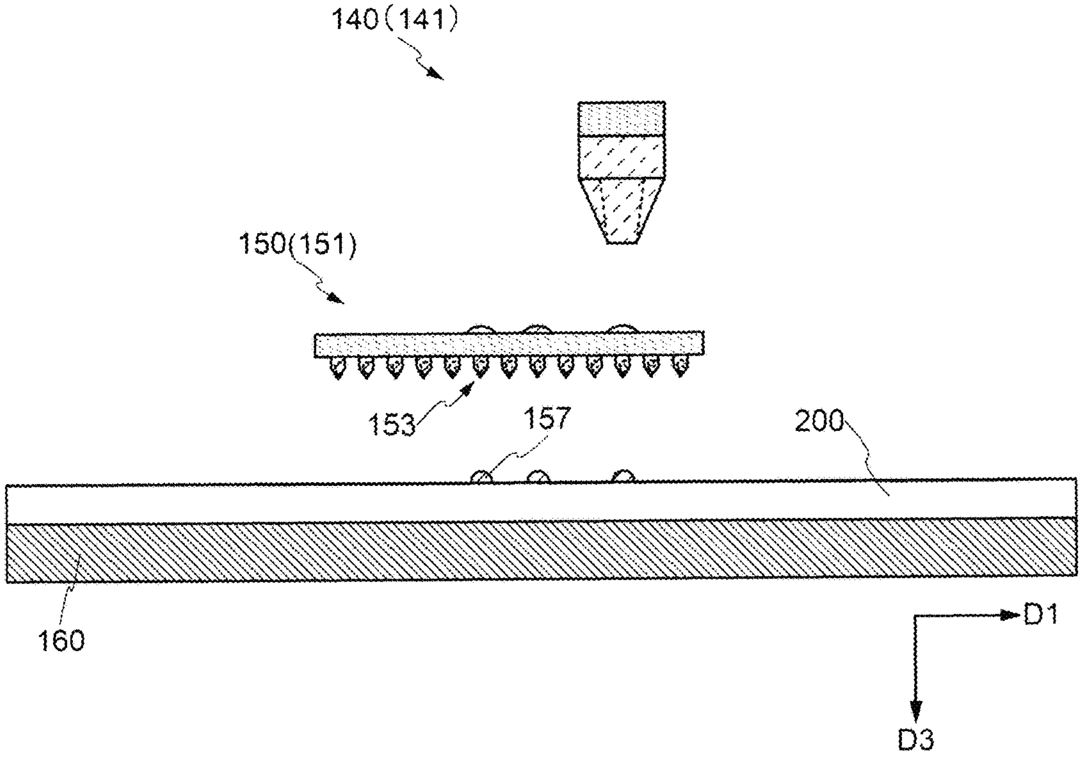
FIG. 8 is a schematic diagram showing a droplet discharging method according to an embodiment of the present disclosure.

Next, the power supply unit 120 applies a pulse voltage (in this example, 1000 V with respect to an object (GND potential)) to the second droplet discharging unit 150 (the multi-nozzle head 151) under the control of the control unit 110. Thus, as shown in FIG. 7, the second droplet discharging nozzle 153 simultaneously discharges the second droplet 157 using the first droplet 147 (a part of the first droplet 147) provided to the second droplet discharging nozzle 153. As a result, as shown in FIG. 8, a discharge pattern by the second droplet 157 is formed on the object 200.

In the present embodiment, even if the second droplet discharging unit 150 has a multi-nozzle head including a plurality of electrostatic discharging type droplet discharging nozzles, the second droplet discharging unit 150 is not directly connected to the ink tank. Therefore, droplets being discharged from all the second droplet discharging nozzles simultaneously is limited. Only the first droplet discharging unit 140 is connected to the ink tank 135. In the case of the present embodiment, in the case of forming a discharging pattern, a position to which the droplet is desired to be discharged is controlled by a movement of the first droplet discharging unit 140, and a size of the droplet is controlled by the second droplet discharging unit 150.

Therefore, by using the present embodiment, it is possible to change the discharging pattern without replacing the multi-nozzle head. In addition, in the present embodiment, a pattern can be formed using droplets having a small diameter discharged from the electrostatic discharging nozzle with respect to an object. That is, a desired discharging pattern can be formed with high definition by applying the present embodiment.

Second Embodiment

In the present embodiment, a second droplet discharging unit (multi-nozzle head) different from the first embodiment will be described. Specifically, an example in which the second droplet discharging nozzle is two-dimensionally arranged will be described. In addition, due to the relationship of the description, members will be omitted as appropriate.

[2-1. Configuration of Multi-Nozzle Head 151A]

Figure 9:
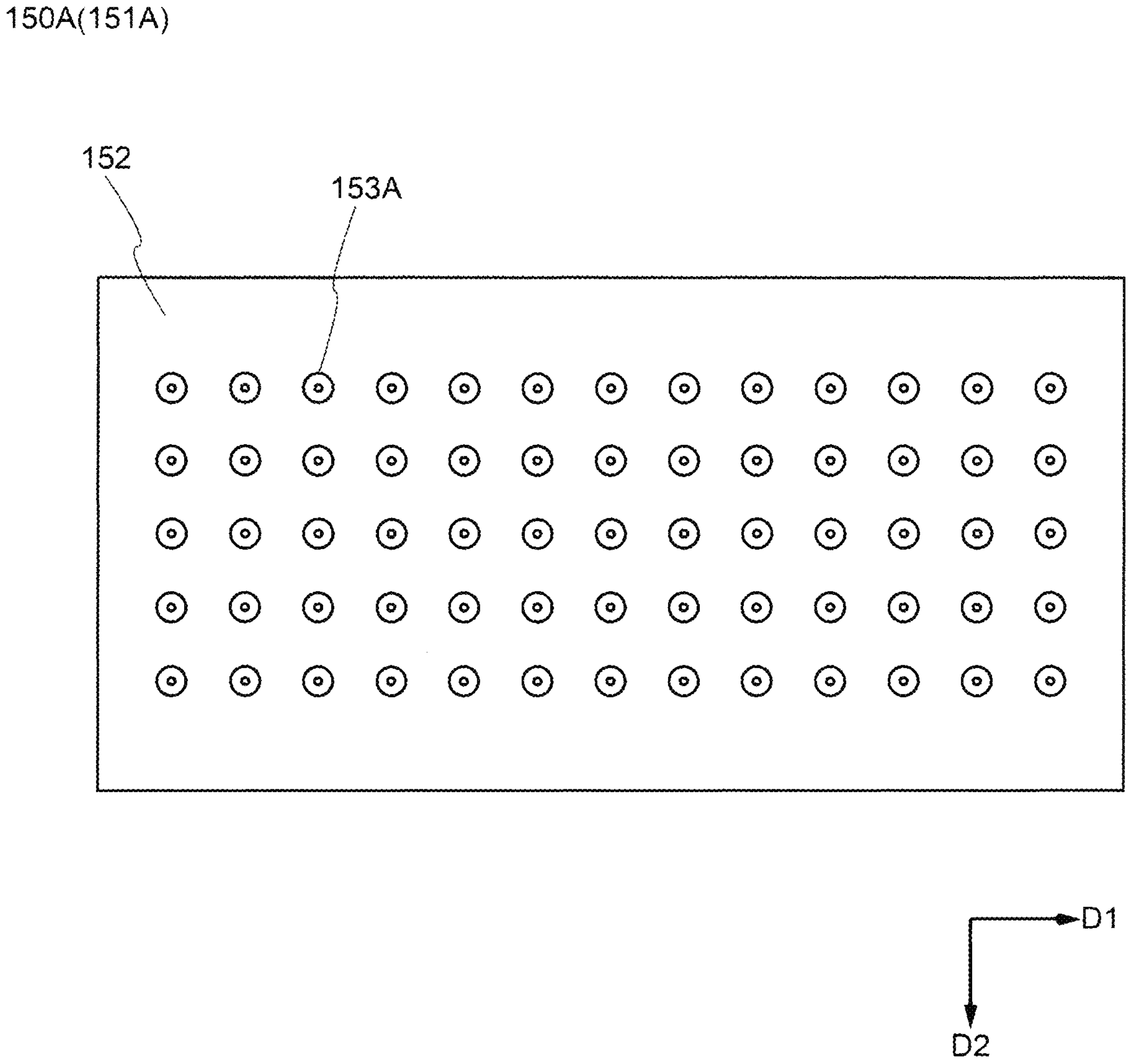
FIG. 9 is a plan view of a multi-nozzle head according to an embodiment of the present disclosure.

FIG. 9 is a plan view of a multi-nozzle head 151A in a second droplet discharging unit 150A. As shown in FIG. 9, the multi-nozzle head 151A includes the plate unit 152 and a second droplet discharging nozzle 153A.

A plurality of second droplet discharging nozzles 153A are arranged on one surface of the plate unit 152. The second droplet discharging nozzles 153A are arranged side by side at equal intervals in the first direction D1 and the second direction D2 intersecting (in this case, perpendicular to) the first direction D1. In this example, the multi-nozzle head 151A includes 5 rows×13 columns=65 droplet discharging nozzles. In addition, the number of the second droplet discharging nozzles 153A is appropriately changed. For example, the number of the second droplet discharging nozzles 153A may be 4 rows×100 columns=400, or 1000 rows×1000 columns=1,000,000.

In the present embodiment, even if the second droplet discharging unit 150A has a multi-nozzle head including a plurality of electrostatic discharging type droplet discharging nozzles arranged two-dimensionally, the second droplet discharging unit 150A is not directly connected to the ink tank 135. Therefore, the droplets are restricted from being simultaneously discharged from all the second droplet discharge nozzles 153A. In this case, only the first droplet discharging unit 140 is connected to the ink tank 135. In the present embodiment, in the case of forming a discharging pattern, a position to which the droplet is desired to be discharged is controlled by a movement of the first droplet discharging unit 140, and a size of the droplet is controlled by the second droplet discharging unit 150A.

Therefore, by using the present embodiment, it is possible to change the discharging pattern without replacing the multi-nozzle head. Further, a desired discharging pattern can be formed with high definition by discharging droplets using an electrostatic discharging type droplet discharging nozzle.

In the present embodiment, although an example in which the second droplet discharging nozzles 153A are arranged at equal intervals in the first direction D1 and the second direction D2 has been shown, the present disclosure is not limited thereto. For example, the second droplet discharging nozzles 153A may be arranged to be displaced (in a zig-zag manner) in the second direction, or may be spaced apart from each other.

Third Embodiment

In the present embodiment, a droplet discharging device different from the first and second embodiments will be described. Specifically, an example in which a plurality of first droplet discharging nozzles is arranged will be described. In addition, due to the relationship of the description, members will be omitted as appropriate.

Figure 10:
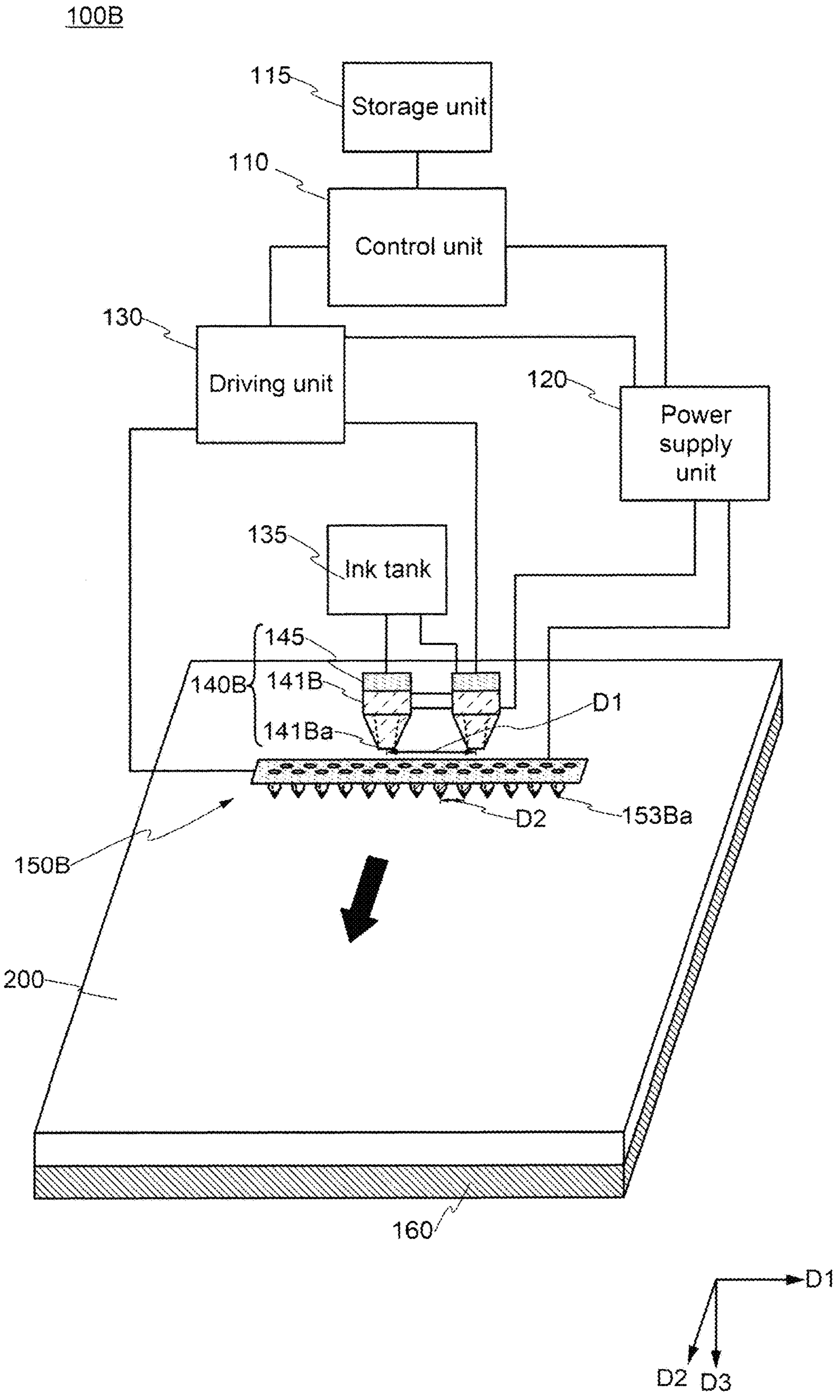
FIG. 10 is a schematic diagram of a droplet discharging device according to an embodiment of the present disclosure.

FIG. 10 is a schematic diagram of a droplet discharging device 100B. As shown in FIG. 10, the droplet discharging device 100B includes the control unit 110, the storage unit 115, the power supply unit 120, the driving unit 130, a first droplet discharging unit 140B, a second droplet discharging unit 150B, and the object holding unit 160.

The first droplet discharging unit 140B includes a plurality of first droplet discharging nozzles 141B. In this example, two first droplet discharging nozzles 141B are arranged side by side in the first direction D1. In addition, each of the first droplet discharging nozzles 141B may be controlled so as to be independently moved and discharged. The number of the first droplet discharging nozzles 141B may be changed as appropriate.

In the present embodiment, a distance D1 between adjacent first droplet discharging nozzles 141B (more specifically, tips 141Ba of the first droplet discharging nozzles 141B) is larger than a distance D2 between adjacent second droplet discharging nozzles 153B (more specifically, tips 153Ba of the second droplet discharging nozzles 153B).

The second droplet discharging nozzles 153B of the second droplet discharging unit 150B may be arranged in the first direction D1 and the second direction D2, similar to the second droplet discharging nozzles 153A.

In addition, in this embodiment, although an example in which the two first droplet discharging nozzles 141B are arranged side by side in the first direction D1 has been shown, the present disclosure is not limited thereto. Three or more first droplet discharging nozzles 141B may be arranged, and the first droplet discharging nozzle 141B may be arranged in a direction that intersects the direction D1.

Figure 11:
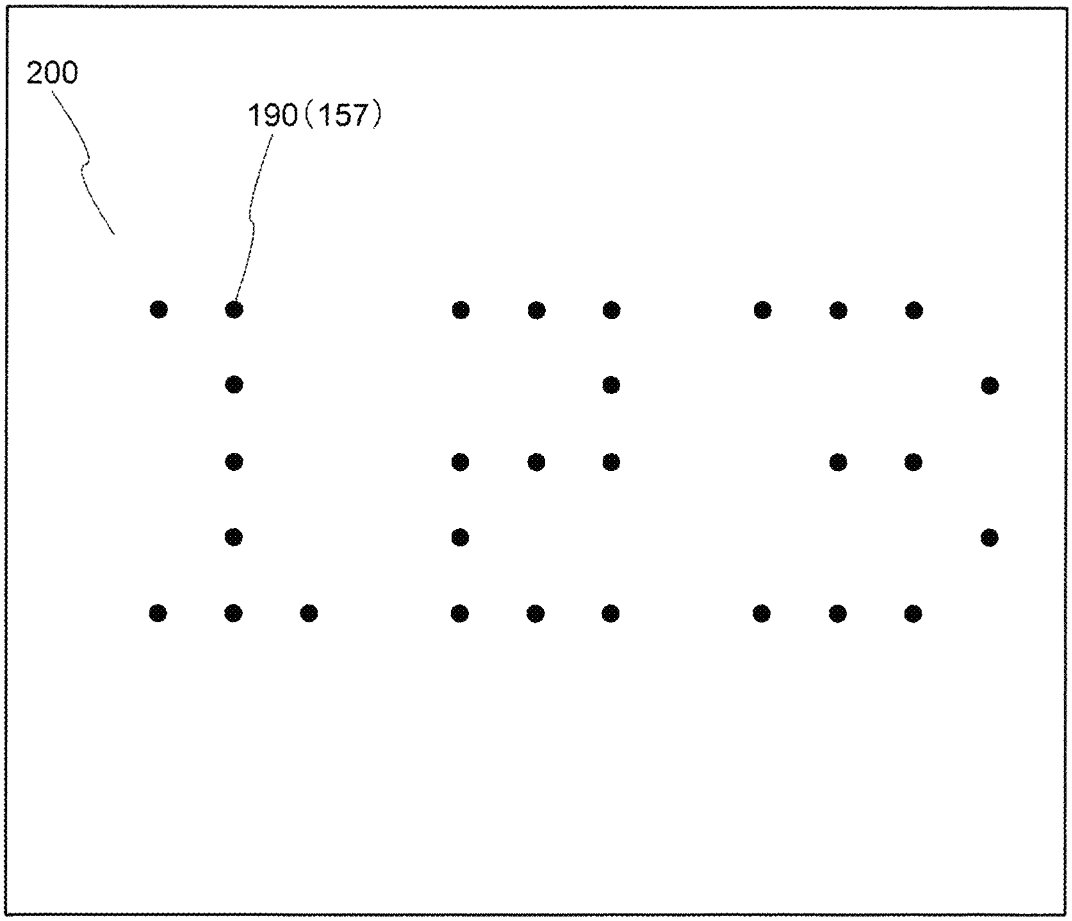
FIG. 11 is a schematic plan view of a formed pattern.

FIG. 11 is a plan view of a pattern formed using the first droplet discharging unit 140B and the second droplet discharging unit 150B. As shown in FIG. 11, a pattern 190 formed by the second droplet 157 is arranged on the object 200. In the present embodiment, the first droplet discharging unit 140B and the second droplet discharging unit 150B are combined and used. In this case, the first droplet discharging nozzle 141B of the first droplet discharging unit 140B moves two-dimensionally to a desired position on a multi-nozzle head 151B. A complex desired pattern can be formed in a short time without replacing the multi-nozzle head by discharging droplets from each of the first droplet discharging nozzles 141B simultaneously.

In addition, in the present embodiment, the first droplet discharging unit 140B may discharge (also referred to as drawing) droplets onto the second droplet discharging unit 150B at the time of transporting a substrate and the time of aligning the substrate.

In the conventional case, the droplet discharging (drawing) process is started after the transport and alignment operations of the substrate are completed. On the other hand, in the case of the present embodiment, these process times (transport and alignment of the substrate) can be applied to the discharging process of the first droplet. Therefore, it is possible for the second droplet discharging unit 150B to perform a discharge process at the same time immediately after the alignment of the substrate. As a result, very high-speed drawing is possible.

Therefore, by using the present embodiment, it is possible to form a desired discharging pattern with high definition using an electrostatic discharging type multi-nozzle head, and it is possible to form a more complicated discharging pattern at high speed while eliminating wasteful time.

Fourth Embodiment

In the present embodiment, a droplet discharging device different from the first to third embodiments will be described. Specifically, a droplet discharging device having an inspection unit will be described. In addition, due to the relationship of the description, members will be omitted as appropriate.

Figure 12:
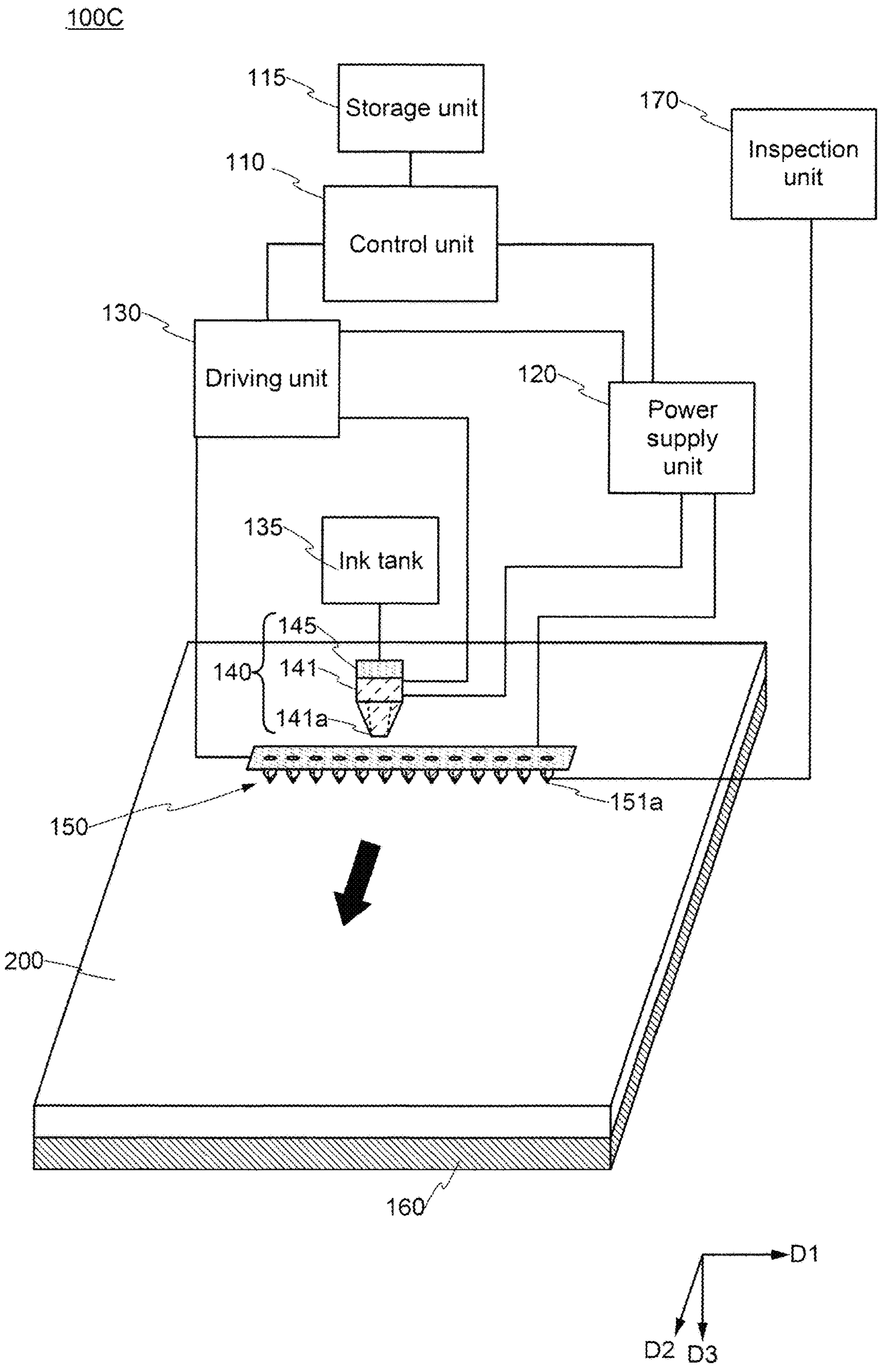
FIG. 12 a schematic diagram of a droplet discharging device according to an embodiment of the present disclosure.

FIG. 12 is a schematic diagram of a droplet discharging device 1000. As shown in FIG. 12, the droplet discharging device 1000 includes an inspection unit 170 in addition to the control unit 110, the storage unit 115, the power supply unit 120, the driving unit 130, the first droplet discharging unit 140, the second droplet discharging unit 150, and the object holding unit 160.

The inspection unit 170 may inspect the tip 153*a* of the second droplet discharging nozzle 153 prior to discharging droplets. A CMOS image sensor may be used as the inspection unit 170. Some of the droplets discharged from the first droplet discharging unit 140 may remain in the second droplet discharging nozzles 153 of the second droplet discharging unit 150. The second droplet discharging nozzle 153 may be cleaned when the tip 153*a* of the second droplet discharging nozzle 153 satisfies a predetermined condition when the inspection unit 170 inspects the second droplet discharging unit 15. In this case, the predetermined condition may be an occlusion rate of the tip 153*a* of 30% or more. When cleaning the second droplet discharging nozzle 153, an organic solvent may be used.

The second droplet 157 can be stably discharged from the second droplet discharging unit 150 by using the present embodiment.

Modification

Within the scope of the present disclosure, those skilled in the art will recognize that various changes and modifications may occur and it is understood that such changes and modifications are also within the scope of the present disclosure. For example, a person skilled in the art can appropriately add, delete, combine or change the design of each embodiment, or add, omit, or change the conditions to the embodiments described above and such changes are included in the scope of the present disclosure as long as the present disclosure is provided.

In the first embodiment of the present disclosure, although an example in which the discharged first droplet 147 is provided to a predetermined second droplet discharging nozzle 153 and temporarily stored has been shown, the present disclosure is not limited thereto. The second droplet 157 may be discharged without being stored after being provided to the second droplet discharging nozzle 153 by controlling the voltage timing applied to the multi-nozzle head 151. Specifically, voltages may be applied to the first droplet discharging nozzle 141 and the second droplet discharging nozzle 153 simultaneously.

In the first embodiment of the present disclosure, although an example in which the first droplet discharging unit 140 is arranged on the object 200 (the object holding unit 160) and the second droplet discharging unit 150 has been shown, the present disclosure is not limited thereto. The first droplet discharging unit 140 may discharge the first droplet 147 to the object 200 without passing through the second droplet discharging unit 150 (the multi-nozzle head 151). As a result, it is possible to form a pattern having a large droplet size together with a high-definition pattern on the object 200.

In addition, in the first embodiment of the present disclosure, although an example in which the plurality of second droplet discharging nozzles 153 simultaneously discharge has been shown, the present disclosure is not limited thereto. The plurality of second droplet discharging nozzles 153 may discharge sequentially divided into a plurality of times.

Further, in the first embodiment of the present disclosure, although an example in which the second droplets 157 are discharged after the first droplet 147 is discharged to some of the second droplet discharging nozzles 153 has been shown, the present disclosure is not limited thereto. For example, one first droplet 147 may be discharged and stored in the second droplet discharging nozzle 153, and then the second droplet 157 may be discharged. The timing of discharging the first droplet and the second droplet may be controlled as appropriate.

Further, in the case of the first embodiment of the present disclosure, although an example in which the first droplet discharging nozzle 141 and the multi-nozzle head 151 (the second droplet discharging nozzle 153) are arranged above the object to which droplets are discharged has been shown, the present disclosure is not limited thereto. For example, when the first droplet 147 is discharged, the first droplet discharging nozzle 141 and the multi-nozzle head 151 (the second droplet discharging nozzle 153) may not be arranged above the object 200. In addition, when the second droplet 157 is discharged, the first droplet discharging nozzle 141 may not be arranged above the multi-nozzle head 151 (the second droplet discharging nozzle 153) and the object 200.

What is claimed is:

1. A droplet discharging device comprising:

an object holding unit configured to hold an object;

at least one first droplet discharging nozzle configured to discharge a first droplet;

a plurality of second droplet discharging nozzles having a second tip having a second inner diameter smaller than a first inner diameter of a first tip of the first droplet discharging nozzle and configured to discharge a second droplet using the first droplet discharged from the first droplet discharging nozzle; and a driving unit configured to control a relative positional relationship between the object held by the object holding unit and the second droplet discharging nozzle and a relative positional relationship between the first droplet discharging nozzle and the second droplet discharging nozzle.

2. The droplet discharging device according to claim 1, wherein each of the plurality of second droplet discharging nozzles is connected to a plate unit having a through hole of a third inner diameter larger than the second inner diameter.

3. The droplet discharging device according to claim 1, wherein the at least one first droplet discharging nozzle includes a plurality of first droplet discharging nozzles, and a distance between adjacent second droplet discharging nozzles is smaller than a distance between adjacent first droplet discharging nozzles.

4. The droplet discharging device according to claim 1, wherein the first droplet discharging nozzle is a piezo type nozzle, and the second droplet discharging nozzle is an electrostatic discharging type nozzle.

5. The droplet discharging device according to claim 1, wherein the plurality of second droplet discharging nozzles are provided in a first direction and a second direction intersecting the first direction.

6. The droplet discharging device according to claim 1, further comprising:

an inspection unit configured to inspect an opening state of the second droplet discharging nozzle.

7. The droplet discharging device according to claim 6, wherein the second droplet discharging nozzle is cleaned when a predetermined condition is satisfied.

8. A droplet discharging method, comprising:

providing a first droplet discharged by a first droplet discharging nozzle to at least one of a plurality of second droplet discharging nozzles arranged with a second tip having a second inner diameter smaller than a first inner diameter of a first tip in the first droplet discharging nozzle, wherein the second droplet discharging nozzle provided with the first droplet discharges a second droplet to an object using the first droplet.

9. The droplet discharging method according to claim 8, wherein the first droplet discharging nozzle is a piezo type nozzle, and the second droplet discharging nozzle is an electrostatic discharging type nozzle.

10. The droplet discharging method according to claim 9, wherein the second droplet discharging nozzle is cleaned when a predetermined condition is satisfied.

* * * * *